United States Patent [19]

Kung

[11] Patent Number: 5,418,012

[45] Date of Patent: May 23, 1995

[54] CONVERSION COATINGS ON SILICON CARBIDE

[75] Inventor: Steve Kung, North Canton, Ohio

[73] Assignee: The Babcock & Wilcox Company, New Orleans, La.

[21] Appl. No.: 148,089

[22] Filed: Nov. 4, 1993

[51] Int. Cl.[6] ............................................. C23C 16/00
[52] U.S. Cl. .................................. 427/249; 427/252; 427/253; 427/376.6; 427/377; 427/383.3; 427/404; 427/419.1
[58] Field of Search ............ 427/249, 252, 253, 376.6, 427/377, 383.3, 404, 419.1

[56] References Cited

U.S. PATENT DOCUMENTS

| | | | |
|---|---|---|---|
| 4,590,095 | 5/1986 | Park | 427/96 |
| 5,041,309 | 8/1991 | Davis et al. | 427/217 |
| 5,135,777 | 8/1992 | Davis et al. | 427/217 |
| 5,208,071 | 5/1993 | Davis et al. | 427/253 |
| 5,209,950 | 5/1993 | Schwartz et al. | 427/252 |
| 5,225,246 | 7/1993 | Beers et al. | 427/253 |
| 5,242,710 | 9/1993 | Claar et al. | 427/248.1 |

OTHER PUBLICATIONS

S. C. Kung and R. A. Rapp, "Kinetics Study of Aluminization of Iron by Using the Pack Cementation Technique," J. Electrochem. Soc., vol. 135, No. 3, p. 731, 1988.

Primary Examiner—Shrive Beck
Assistant Examiner—Benjamin L. Utech
Attorney, Agent, or Firm—Daniel S. Kalka; Robert J. Edwards

[57] ABSTRACT

A pack cementation method is described for producing conversion coatings on a ceramic. In particular, silicon carbide is coated with $Cr_2O_3$-forming compounds for improved sulfidation and ash-deposit resistance. The method is applicable to continuous fiber ceramic composites or a monolithic substrate. The conversion coatings are multilayered coating systems with the coating morphologies expressed as follows:

$Cr_{23}C_6/Cr_7C_3/Cr_7C_3$-$Cr_3Si/Cr_5Si_3C_x$/Substrate $Cr/Cr_3Si/Cr_5Si_3C_x$/SiC Substrate 17 Claims, 6 Drawing Sheets

CONVERSION COATINGS ON SILICON CARBIDE

BACKGROUND OF THE INVENTION

1. Field of the Invention

The present invention relates in general to conversion coatings on ceramics, and more particularly to a pack cementation technique to produce conversion coatings on the surface of silicon carbide (SIC).

2. Description of the Related Art

In the past decade, extensive efforts have been made to develop advanced utility power plants and energy conversion/cogeneration systems. Utilization of these advanced systems may significantly improve energy efficiency and reduce toxic emission. To increase the operation efficiency, however, the utility boilers and conversion/cogeneration systems must operate at much higher temperatures and steam pressures. Therefore, many components, such as the heat exchanger tubes and hot-gas clean up systems, will be exposed to corrosive environments at temperatures up to 1100°–1370° C. (2000°–2500° F.). These temperatures are noticeably higher than those experienced in the modern utility boilers. As a result, suitable materials of construction are critical to the success of the high-efficiency systems.

While new high-temperature metallic materials are being developed for these applications, ceramics and ceramic composites are considered the leading candidates to meet the extreme requirements of certain advanced boiler components. Among them, silicon carbide (SIC) is the prime ceramic of interest because of its high-temperature properties, including its excellent thermal conductivity (125 W/mK at RT), low density (3.10 g/cm$^3$ for dense material), extremely high mechanical strength, relatively good toughness, and low cost. The maximum use temperature of SiC exceeds 1400° C. (2552° F.).

In general, silicon carbide is corrosion resistant to high-temperature environments. However, SiC has not shown satisfactory corrosion resistance to very sulfidizing (reducing) environments. Under reducing atmospheres, active corrosion may occur on the protective SiO$_2$ scale due to the formation of volatile compounds, such as SiO, SiCl$_4$, SiCl$_2$, and SiS. The corrosion rates of SiO$_2$ can be further escalated by molten ash deposits. When molten ash deposits are present, the SiO$_2$ formed on the substrate surfaces may be readily destroyed via the well-known fluxing mechanisms. Consequently, the underlying SiC substrates will be constantly exposed to the corrosive environments, and an accelerated wastage of material is observed.

Unlike SiC, chromium carbides have shown much improved corrosion resistance to sulfidation and molten ash deposit. The corrosion resistance is provided by the formation of a protective chromium oxide (Cr$_2$O$_3$) surface scale. The ability of materials to form a Cr$_2$O$_3$ scale has served as the basis for the development of numerous heat-resistant alloys and coatings used in severe environments at high temperatures. For example, chromizing coatings have been used to improve the performance of various boiler components suffering accelerated corrosion attack.

However, chromizing on ceramic materials, such as silicon carbide, its derivatives, and other types of ceramic carbides, has not been reported.

SUMMARY OF THE INVENTION

The present invention solves the aforementioned problems with the prior art as well as others by providing a pack cementation method for producing conversion coatings on a ceramic material.

This invention is featured by the formation of conversion coatings on silicon carbide and its derivatives to improve their high-temperature corrosion resistance to sulfidation, chlorination, and molten ash deposit. The conversion coatings are formed on these carbides consist of a multi-layered structure, with each of the layers containing a high concentration of chromium. As a result, the coatings can form a protective Cr$_2$O$_3$ scale upon exposure to extremely aggressive environments at high temperatures. The superior corrosion resistance of Cr$_2$O$_3$ scale in reducing/sulfidizing environments and ash deposits has been demonstrated by many laboratory and field studies; whereas the SiO$_2$ scale has suffered significantly in similar environments from the corrosion attack via various corrosion mechanisms proposed in the literature.

The conversion coating process involves placing the ceramic material in a pack mix inside a steel or ceramic retort. The pack mix comprises a source metal or alloy powder (pure metal powder and/or alloy powder), a halide salt as activator, and an inert oxide powder as filler. The retort is sealed and then heated to an elevated temperature in a furnace and held for an extended period of time under an inert cover gas. At the coating temperature, the activator reacts with the source metal or alloy powder to form various gaseous halide species. These vapors enable the transport of the source metal from the pack mix to the substrate surfaces and subsequently, the formation of new source metal-rich phases on the substrate surfaces.

One object of the present invention is a method for producing conversion coatings on a ceramic material.

Another object of the present invention is a method for producing conversion coatings on silicon carbide.

Still another object of the present invention is a silicon carbide having conversion coatings produced by the method described herein.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
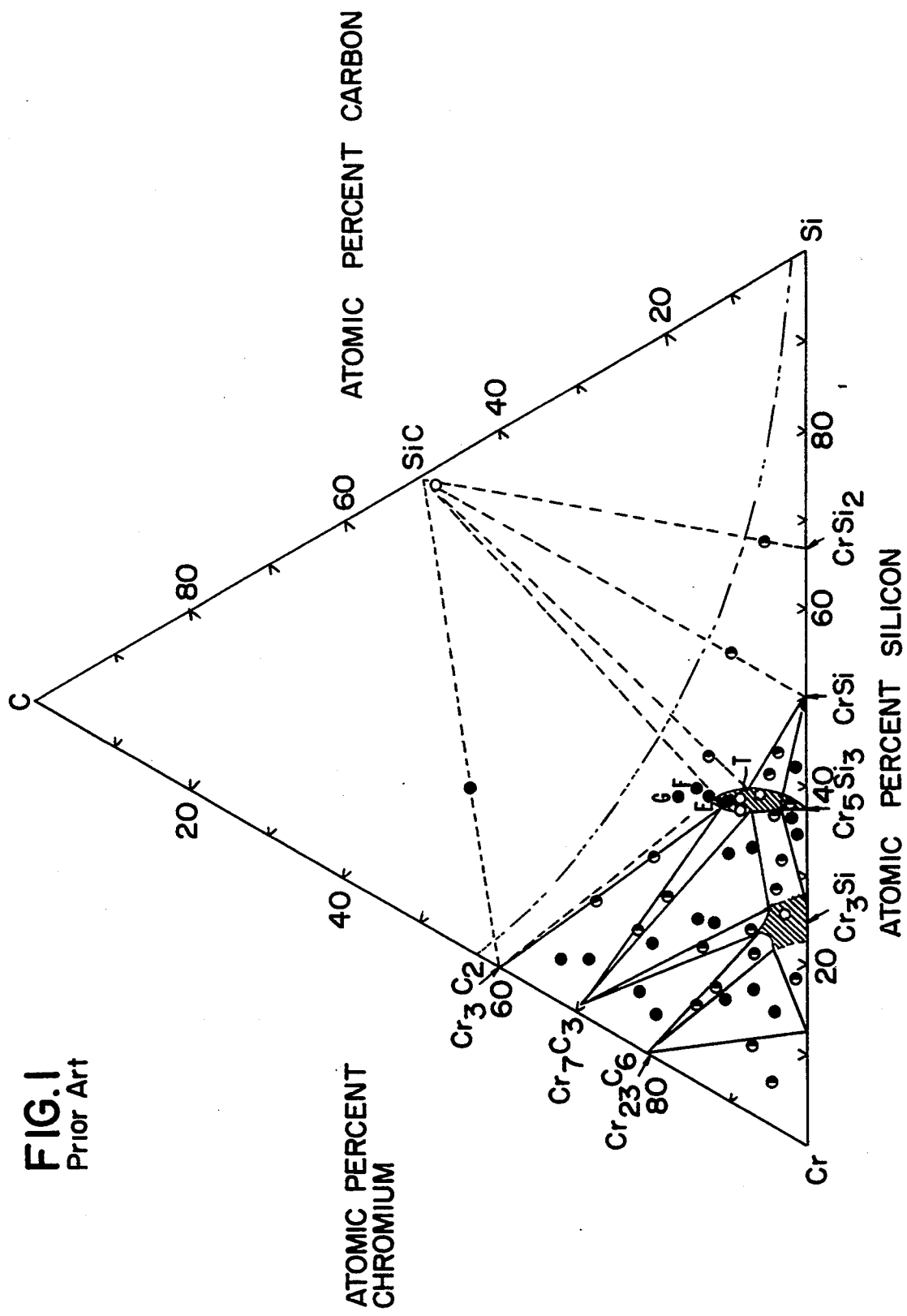
FIG. 1 is a ternary phase diagram of the Cr—Si—C system.

Based on the superior corrosion resistance of chromium carbides and chromium, i.e., their ability to form a more protective $Cr_2O_3$ scale, the present invention uses these materials as coatings on SiC. The chromium-carbide and chromium coatings provide the needed corrosion resistance for SiC exposed to reducing gases and molten ash deposits in advanced boilers and conversion/cogeneration systems by forming a $Cr_2O_3$-base oxide scale. Therefore, the underlying SiC substrate is not directly subjected to the severe environments. On the other hand, the SiC substrates still possess the ability to form $SiO_2$ underneath the chromium-carbide and chromium coatings if defects are developed in the coating layer. Therefore, a "self-healing" process takes place and allows the surface chromium carbides and chromium to regenerate a $Cr_2O_3$ protective scale. Consequently, a catastrophic failure is not likely to occur. An added advantage from using the chromium-carbide and chromium coatings is that the difference of thermal expansion coefficients (CTE) between the coatings and SiC is relatively small, thus minimizing the tendency for the coatings to spall or crack during the inevitable thermal cycling in boiler operations.

Because SiC is not electrically conductive, many commercial coating techniques, such as ESD and electro-plating, can not be used to apply the chromium-carbide and chromium coatings onto SiC. Other techniques operated under the principle of thermal spray often result in a porous coating morphology and poor coating adherence. The coating method of the present invention directly "converts" the surfaces of SiC to chromium carbides and/or chromium. This process, also referred to as conversion coatings, is achieved by chemically "mixing" the coating elements into the substrate surfaces at high temperatures via diffusional processes. After the coating elements are enriched beyond their solubility limits in SiC, different phases become stable at the substrate surfaces. Consequently, a surface layer rich in the coating elements is created. Because diffusional processes are involved in the conversion coating processes, the coating adherence accomplished on the underlying substrates is generally superior.

The coatings consist of a $Cr_2O_3$-forming outer layer, such as chromium carbides and Cr metal, to provide the needed corrosion resistance by forming a protective oxide scale.

Thermodynamic data show that a total of three chromium-carbide phases are present in the chromium-carbon binary system, i.e., $Cr_3Cr_2$, $Cr_7C_3$, and $Cr_{23}C_6$. Because both $Cr_3C_2$ and $Cr_{23}C_6$ (i.e., the lowest and highest Cr-containing chromium carbides, respectively) are corrosion resistant to sulfidation and ash deposit, as reported in the literature, the intermediate carbide ($Cr_7C_3$) should also perform well. However, it is of general consensus that lower carbides, which contain higher amounts of Cr, have a stronger tendency to form protective $Cr_2O_3$. Therefore, it is desirable to produce conversion coatings consisting of an outer $Cr_{23}C_6$ and-/or $Cr_7C_3$ layer. Furthermore, if the metallic chromium phase is formed on the outer surface, the corrosion resistance can also be significantly improved.

The specific coating parameters generated from the present invention, which successfully produced $Cr_2O_3$-forming conversion coatings systems on SiC, are summarized below. Although these parameters were utilized to produce the coating layers in the present invention, their ranges can be easily expanded or the chemicals varied to achieve similar successes. Also, while a monolithic tube is used as the substrate, the method of the present invention is equally applicable to fibers. For example, the chromium-carbide and chromium coatings are directly converted on the fibers of SiC and then used to form continuous fiber ceramic composites (CFCCs). Similarly, conversion coatings can be produced directly on the fabricated CFCC.

Coating Temperature: 1250° C. (2282° F.)
Coating Time: 30 Hours
Cover Gas: De-oxidized Argon
Pack Composition (wt. %) 20% Source Metal or Alloy (Cr or Cr—Al)
3% Activator ($AlCl_3$ or $NH_4Cl$)
77% Inert Filler ($Al_2O_3$)

Using the above coating parameters, a total coating thickness of 160–185 $\mu$m is achievable on SiC and its derivatives. The coating layers are relatively dense and pore-free compared to the underlying SiC substrate. Excellent coating adherence is accomplished. The coating systems contain a multi-layered structure with different layers consisting of different phases. The coating systems produced by using $AlCl_3$ and $NH_4Cl$ as the activator are different, i.e.,:

$AlCl_3$ Activator: $Cr_{23}C_6/Cr_7C_3$ /$Cr_7C_3+Cr_3Si_3$-$Si_3C_x$/SiC Substrate $NH_4Cl$ Activator: $Cr/Cr_3Si/Cr_5Si_3C_x$/SiC Substrate Although there is extensive experience in chromizing of carbon and low-alloy steels for boiler replacement parts, the coating art is limited to metallic substrate materials. Using the pack cementation technique to form conversion coatings on ceramic materials must be conducted at a much higher temperature than those employed for the diffusion coatings on metals. The higher processing temperatures can significantly alter the chemical equilibria and predominant vapor species in the coating packs, which then affect the reaction kinetics involved in the coating mechanisms. Unlike diffusion coatings on metals, a diffusion zone, in which a concentration gradient of the coating elements is observed, is generally not existing for ceramics. Furthermore, other considerations should be stressed for diffusion coatings on ceramics, such as the requirement for an optimal match of thermal expansion coefficients between the coating materials and the SiC substrates subjected to thermal cycling.

The pack-cementation coating process involves burying the parts to be coated with a pack mix in a retort. The pack mix is comprised of powders of (1) a source metal or alloy (masteralloy alloy), (2) a small amount of halide salt (activator), and (3) a large quantity of inert oxide (filler). The retort is sealed and then heated to an elevated temperature in a furnace and held for an extended period of time. At the coating temperature, the activator reacts with the masteralloy to form various gaseous species of metal halides in the pack. Because of the presence of an activity gradient of the coating element(s) between the pack mix and the substrate, the vapors of lower halides (i.e., those species containing higher ratios of the coating elements to halogen) tend to diffuse toward the substrate surfaces through the pores of the pack mix. At the substrate surfaces, reduction reactions take place and the coating elements are released from the metal halides. The coating element(s) then mixes with the substrate and becomes part of the substrate constituents in the surface regions. Details of metal pack cementation processes and coating mechanisms are known in the art and are not repeated here.

To achieve chromium-carbide and chromium conversion coatings on SiC, Cr must be introduced to the SiC surfaces via the diffusional processes at high temperatures. Therefore, Cr metal or a Cr-containing alloy needs to be employed as the source metal (masteralloy). Many halide salts can potentially be used as the activator in the pack coating processes. However, a proper selection of the activator salt is imperative to the success of achieving conversion coatings on SiC.

For successful conversion of the SiC surfaces to chromium carbides and/or chromium the coating phases must be more thermodynamically stable than those of SiC and Cr in direct physical contact. The higher tendency for the formation of chromium carbides was demonstrated by Pellegrini et al., "A Survey of the Cr-Rich Area of the Cr—Si—C Phase Diagram," J. Electrochem, So., Vol. 1991, No. 4, p. 535, 1972 who experimentally determined the ternary phase diagram of the Cr—Si—C system at 1400° C. (2552° F.), shown in FIG. 1. Lyakishev et al., "Thermodynamic Investigation of Inter-Particle Interactions in the Me [Ti, V, Cr, Mn, Fe, Co, Ni]—Si—C Systems as Theoretical Prerequisites for Improving the Technology of Smelting Bulk Silicon Ferroalloys," Russian Metallurgy [1], 1-9, Jan.-Feb., 1991, also constructed the Cr-Si-C phase diagram at different temperatures based on thermodynamic calculations, and their results were essentially identical to those shown in FIG. 1. Therefore, FIG. 1 is representative of the Cr—Si—C phase diagram in a wide temperature range.

The tie lines for the two-phase equilibria in FIG. 1 are connecting chromium carbides and chromium silicides, such as $Cr_7C_3$ with $Cr_3Si$ and $Cr_3Si_3C_x$. Such a relationship clearly demonstrates that the combination of a chromium carbide and chromium silicide is more stable than that of SiC and the Cr source metal. In other words, it is not thermodynamically stable for SiC and the Cr source metal to be in direct contact, and they must be separated by the formation of chromium carbide(s) and chromium silicide(s). A metallic Cr phase may form when the Cr activity is extremely high.

The phase diagram also signifies that, when chromium carbides are formed in between SiC and Cr, chromium silicides can also be formed as part of the coatings. The co-existence of chromium silicides with chromium carbides in the coating layers is desirable because of an improved mechanical properties resulting from the existence of a dual-phase (or composite) structure. In addition, both Cr and Si in chromium silicides can form protective oxides, so long as the chromium silicides are rich in Cr to ensure the formation of $Cr_2O_3$.

EXAMPLES

Figure 2:
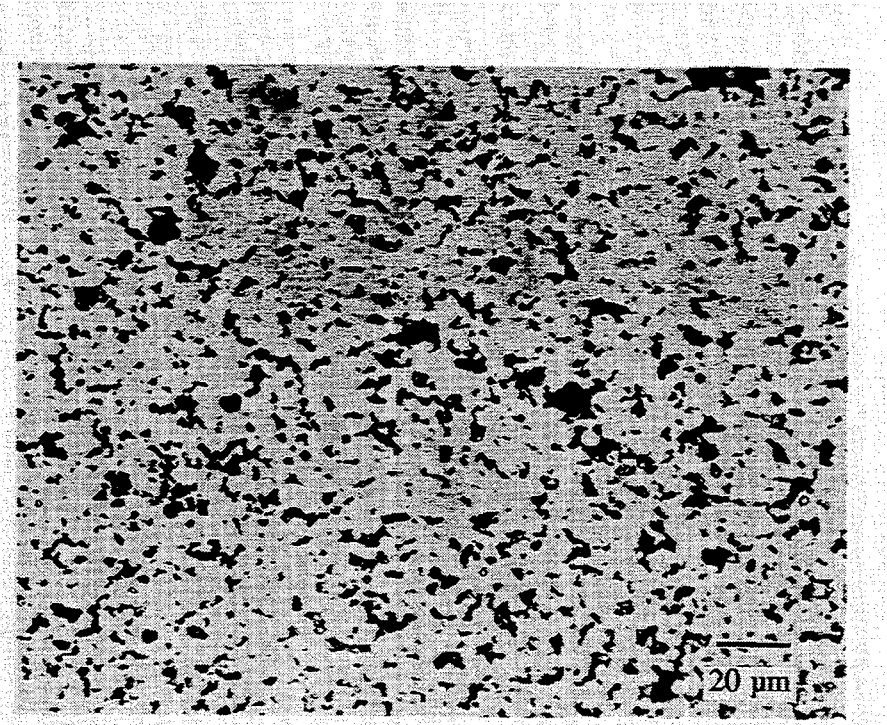
FIG. 2 is a cross-sectional optical micrograph of the Hexoloy SA SiC.

A one-foot segment of Hexoloy SA alpha-SiC tube with a dimension of 4" OD×⅛" wall thickness was obtained. The monolithic SiC tube was produced by Carborundum, Niagara Falls, N.Y., by pressureless sintering of submicron SiC powder. The sintering process resulted in a self-bonded, fine grain (less than 10 micron) SiC product which is extremely hard, light weight, and relatively low in porosity. Table 1 lists some of the important physical and mechanical properties of the Hexoloy SA alpha-SiC. FIG. 2 is a cross-sectional optical micrograph of the SiC material containing a large amount of preexisting fine porosity.

TABLE 1

| Typical Physical and Mechanical Properties of Hexoloy SA SiC | |
|---|---|
| Grain Size | 4–6 μm |
| Density | 2.99–3.10 g/cm$^3$ |
| Porosity | 1.1% |
| Hardness (Knoop) | 2800 Kg/mm$^2$ |
| Flexure Strength (4 Pt., RT) | 460 MPa |
| Flexure Strength (3 Pt., RT) | 550 MPa |
| Compressive Strength (RT) | 3900 MPa |
| Elastic Modules (RT) | 410 MPa |
| Fracture Toughness (RT) | 4.60 MPa/m$^{\frac{1}{2}}$ |
| Coeff Thermal Expansion (RT-700° C.) | 4.02 × 10$^{-6}$ 1/°K. |
| Maximum Service Temp. (in Air) | 1650° (3000° F.) |

In the present study, pure Cr metal powder and a 90Cr-10Al alloy powder were chosen as the source metals (masteralloys). Pure Cr powder is readily available commercially and therefore is an ideal raw material to be used in large-scale coating productions. The incorporation of 90Cr-10Al as a masteralloy was to evaluate the effects from co-deposition of Al with Cr on the resulting chromium-carbide and chromium coatings.

Five halide salts, including $AlF_3$, $NH_4Cl$, $AlCl_3$, $NaCl$, and $NaF$, were investigated in this study. The partial pressures of various vapor species in the packs containing pure Cr as the masteralloy in equilibrium with these activators have been previously extensively evaluated, and the results serve as the basis of the system designs here. Alumina powder ($Al_2O_3$) was selected as the inert oxide filler because of its extremely high chemical stability, high melting point, excellent commercial availability, and low cost. Table 2 summarizes the chemical constituents of the six pack-mix systems designed for this conversion-coating study.

TABLE 2

| Chemical Constituents of the Designed Coating Systems | | | |
|---|---|---|---|
| System | Masteralloy | Activator | Inert Filler |
| 1 | Cr | AlF$_3$ | Al$_2$O$_3$ |
| 2 | Cr | NH$_4$Cl | Al$_2$O$_3$ |
| 3 | Cr | AlCl$_3$ | Al$_2$O$_3$ |
| 4 | Cr | NaCl | Al$_2$O$_3$ |
| 5 | Cr | NaF | Al$_2$O$_3$ |
| 6 | 90Cr—10Al | NaF | Al$_2$O$_3$ |

All of the coating systems in Table 2 consisted of 3 wt % activator, 20 wt % source metal (masteralloy), and 77 wt % $Al_2O_3$. Constituents of the coating packs were carefully weighed and thoroughly mixed. Coupons of SiC samples with a dimension of ½"×¾"×¼" were cut from the one-foot tube segment and used as the substrates. The SiC coupons were cleaned in methanol and dried; no further surface polishing and cleaning were employed. The SiC samples were buried in 1" OD×3" alumina crucibles serving as the coating retorts with the pack mixes. The alumina crucibles were then covered with alumina disks and sealed with alumina cement (Ceramobond).

Following the assembly of the coating retorts, the crucibles were positioned in the center of an alumina reaction chamber (5" OD×4' long) located in a vertical high-temperature tube furnace. The furnace, manufactured by Ohio Thermal Inc., Columbus, Ohio, was equipped with MoSi$_2$ heating elements. The maximum temperature capability of this furnace was 1600° C. (2912° F.). The end of the reaction chamber was covered with stainless-steel flanges which contained fittings to house the necessary penetrations for the gas inlet/outlet openings and thermocouples.

All of the conversion-coating processes in Table 2 were conducted at 1250° C. (2282° F.) for 30 hours. Table 3 summarizes the coating parameters employed in this study. Industrial-grade argon gas (Ar) was purged through the reaction chamber and used as the cover gas to minimize oxidation of the Cr source metal and 90-Cr-10Al master alloy. Prior to entering the reaction chamber, the Ar was further purified by passing it through an oxygen getter containing titanium chips heated at 700° C. (1400° F.).

TABLE 3

| Coating Parameters for All Coating Systems | |
|---|---|
| Coating Temperature: | 1250° C. (2282° F.) |
| Coating Time: | 30 hours |
| Cover Gas: | De-oxidized Ar |
| Pack Composition (wt. %) | 20% Source Metal |
| | 3 Activator |
| | 77% Al$_2$O$_3$ Filler |

The appearances of the as-coated SiC samples treated with the six conversion-coating systems (Table 2) were quite different. The sample from System #1 did not provide any evidence of successful surface coating; the sample retained the original black SiC color. Compared to the initial dimension of the SiC substrate prior to the coating treatment, this coupon actually displayed some material loss. A loss in material suggests that chemical attack from the pack mix has occurred. It is most likely that the SiC surfaces reacted with the activator (AlF$_3$) to form a low-melting compound at the coating temperature. A loss of material was only observed on the samples coated in System #1.

Unlike System #1, the resulting coupon surfaces from Systems #2 and 3 exhibited a shining appearance, similar to those of finished metals. This appearance strongly suggested that some sort of coatings have been successfully achieved.

Visual inspection on the coatings from Systems #2 and 3 indicated that the coating adherence was good; no evidence of coating spallation or surface cracking was found macroscopically. Unlike System #1, these samples did not suffer from any chemical attack from the pack mixes. In fact, the sample dimension was slightly increased, indicating a successful incorporation of the coating element (i.e., Cr) onto the substrates by these coating processes.

The appearance of the as-coated SiC samples from Systems #4–6 were somewhat similar. All of which showed some degree of success in achieving a surface coating; however, spallation was also evident on these coated samples. The mode of coating spallation appeared to be localized along the edges of the samples coated from System #6, but the spallation was randomly distributed on the sample surfaces treated in System #4. Both of the spallation modes were found on the coated samples from System #5. Comparing these three coated SiC, conversion coatings produced by System #6 seemed to be the best, followed by System #4 and System #5. In comparison, the coating quality produced by Systems #4–6 was between those of System #1 and Systems #2 and 3.

It is noted that the same activator salt (NaF) but different source metals were employed in Systems #5 and 6. A better coating quality achieved by System #6 than System #5 implies that some beneficial effects from the incorporation of Al to the masteralloy do exist.

Figure 3A:
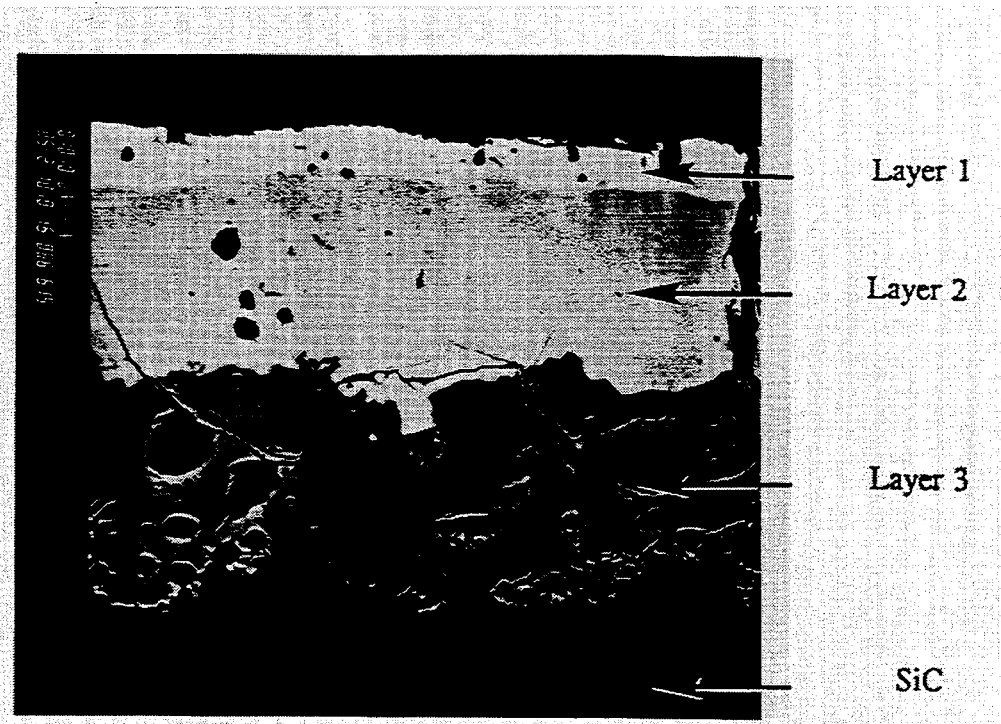
FIG. 3(a) shows a cross sectional SEM micrograph of a coated SiC sample under the back-scattered electron (BSE) mode.

FIGS. 3(a) and (b) show two cross-sectional SEM micrographs of the SiC samples coated with System #3. Both micrographs were taken at the same location, except that one was under the secondary-electron (SE1) mode (FIG. 3b) to reveal the coating geometric profile and the other was under the back-scattered electron (BSE) mode (FIG. 3a) to highlight the compositional profile.

Figure 3B:
FIG. 3(b) shows a cross sectional SEM micrograph of a coated SiC sample under the secondary-electron (SEI) mode.

The SE1 micrograph in FIG. 3(b) shows that a total coating thickness of ~160 μm (6.3 mils) was achieved on SiC. The adherence between the coating and the underlying SiC substrate is excellent. No evidence of any separation or spallation of the coating was found. The coating contains some voids. It is noted that the Hexoloy SA SiC substrates employed here contains pre-existing porosity. It is likely that, during the conversion coating treatment, the large number of small voids pre-existing in the substrates were annihilated to form a fewer but larger voids, perhaps via a growth mechanism similar to that of particle coarsening in metals, often referred to in the art as Ostwald ripening.

However, the voids did not affect the coating adherence in any way, as evidenced by the good coating adherence in FIG. 3. The majority of the voids are confined close to the coating/substrate interface. In fact, the coating near the outer surface is relatively dense and pore-free. A dense and pore-free outer layer is highly desirable for coatings applied on porous substrates, because they can seal the surfaces and prevent corrodants from entering the underlying substrate pores.

The sharp contrast present in the BSE micrograph of FIG. 3(a) clearly indicates that the coating contains three distinctive phase layers with abrupt compositional changes. The brightnesses of the coating layers are directly proportional to their average atomic weights, i.e., the higher atomic weight a coating layer is, the brighter the layer is under the BSE mode. In the Cr-Si-C system, Cr has the highest atomic number, followed by Si and C. Therefore, the outermost layer with a thickness of ~20 μm consists of the highest Cr concentration, followed by the middle and the inner coating layers, each of which at a thickness of ~70 μm. The adherence at each of the phase transition interfaces between two layers is also extremely good.

Careful examinations of the BSE micrograph in FIG. 3(a) reveal that the middle layer actually consisted of two sub-layers, with the region close to the outermost layer rich in a "darker" phase and the region adjacent to the inner layer rich in a "lighter" phase.

Figure 4:
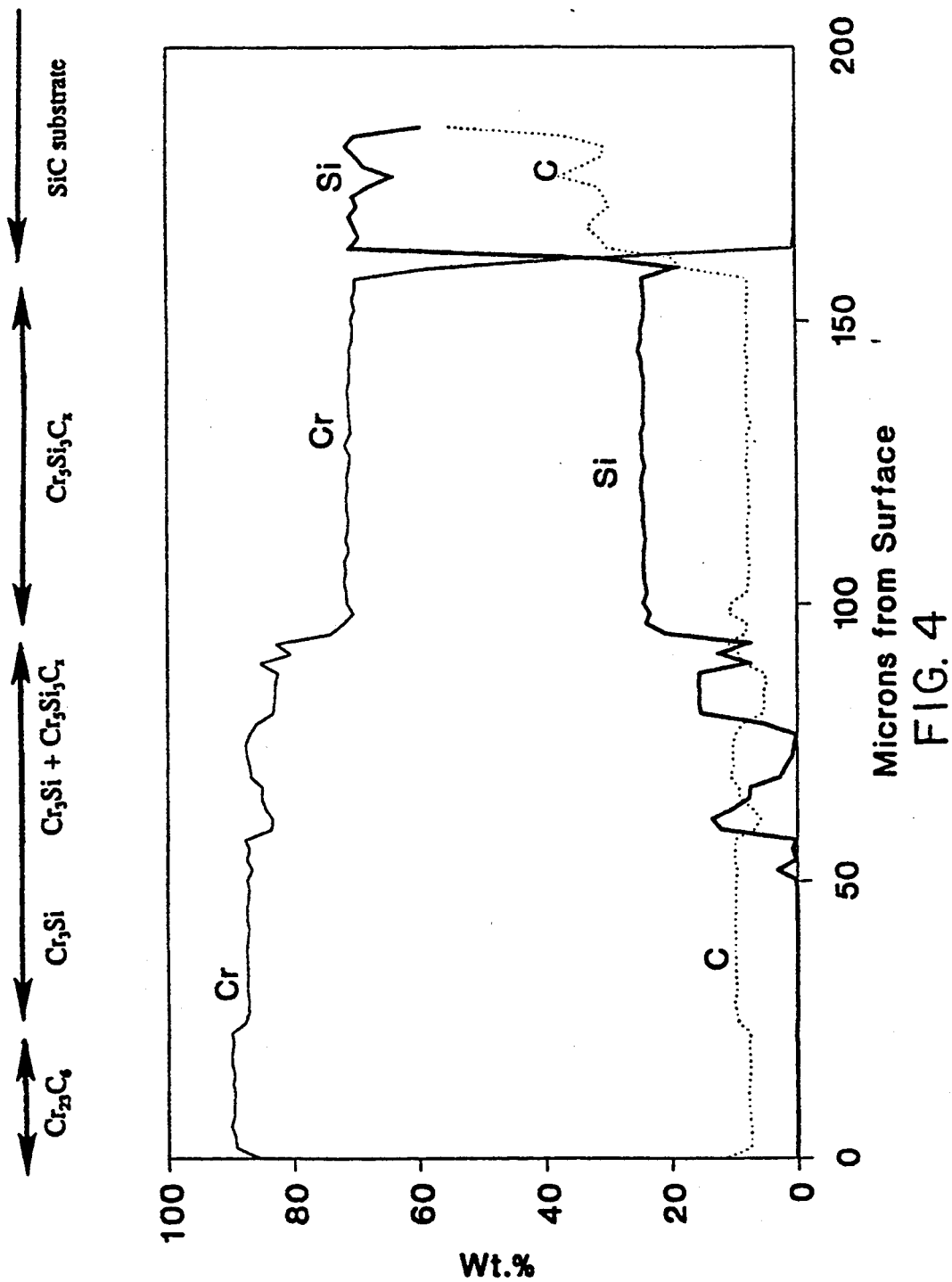
FIG. 4 plots the concentration profiles of Cr, Si, and C generated by electron microprobe analysis (EMPA) from the outer coating surface into the SiC substrate.

FIG. 4 plots the concentration profiles of Cr, Si, and C from the outer coating surface into the SiC substrate. The elemental concentrations were obtained using the electron microprobe analysis (EMPA). The total coating thickness, the three sub-layers, and the points of phase transitions are clearly displayed by these concentration profiles. In the outer layer, the coating is comprised of ~90 wt. % Cr, >7 wt. % C, and essentially no Si. This compostion indicates that a binary chromium-carbide typical for Cr$_{23}$C$_6$ was formed. In the middle layer, the coating composition is divided into two parts, as suggested by the cross-sectional BSE micrograph in FIG. 4. The first half is close to the outer surface and has a thickness of ~30 μm. The composition of this region consisted of ~85wt. % Cr, >7 wt. % C, and essentially no Si. Again, this composition suggests that a binary chromium-carbide phase was produced. The relative concentrations of Cr and C are typical of $Cr_7C_3$.

The second half of the middle layer, adjacent to the inner layer, has a total thickness of ~40 μm and contains a Cr concentration fluctuating from ~82 to 85 wt. %, C from 5 to 10 wt. %, and Si from 0 to 15 wt. %. A fluctuation in the coating composition confirms the presence of a two-phase structure in the second half of the middle layer, as suggested by the BSE SEM micrograph in FIG. 3(a). The phase containing no (or very little) Si in this region is still $Cr_7C_3$. The other phase consisting of ~15 wt. % Si in equilibrium with the $Cr_7C_3$ compound, based on the Cr-Si-C ternary phase diagram in FIG. 1, should therefore be $Cr_3Si$, a binary Cr-Si intermetallic compound.

FIG. 4 shows that the inner (third) layer, exhibiting the lowest brightness within the coating in the BSE micrograph (FIG. 3[a]), contains ~71 wt. % Cr, >7 wt. % C, and 24wt.% Si. Similar to the outer layer, the chemical composition in the inner layer is quite uniform, suggesting that it is comprised of a single phase. However, unlike the outer layer, this layer has significant amounts of all three elements, which suggest that this is a ternary compound. Based on the phase diagram in FIG. 1, the only ternary compound existing in the Cr-Si-C system is the T phase with a formula of $Cr_5Si_5C_x$, where $0.25 < X < 1.05$ at 1400° C. The range of x may change at different temperatures.

Some cracks perpendicular to the sample surface, such as the one shown on the upper right-hand side of the SEM micrographs in FIGS. 3(a) and (b), were found in the coating. The cracks were closely associated with the "columnar" grain boundaries in the conversion coating. A columnar grain structure is a feature of diffusion coatings resulting from inward/outward diffusion of atoms perpendicular to the substrate surfaces. The cracks found in this conversion coating extended typically from the outer surface of the coating to the middle-layer/inner-layer interface.

The cracks in the coating might have been caused by the slight CTE mismatch (i.e., difference in the coefficients of thermal expansion) between the conversion coatings and the substrate. It is most likely that the crack was created during the sample preparations. However, the cracks did not penetrate throughout the coating layer; instead, they terminated at the front of the T phase. Therefore, the porous SiC substrate will still be protected by a high Cr-containing, potentially $Cr_2O_3$-forming compound. For the purpose of corrosion resistance, the existence of vertical cracks would be more favored than that of parallel cracks along the coating/substrate interface. Parallel cracks tend to significantly deteriorate the coating adherence, while vertical cracks preserve the coating integrity. In addition, protective oxides, such as $Cr_2O_3$ and glassy $SiO_2$, may still form within the vertical cracks and therefore, can minimize the localized corrosion attack within the cracks.

The multi-layered coating morphology resulting from System #3 can be expressed as:

$Cr_{23}C_6/Cr_7C_3/Cr_7C_3+Cr_3Si/Cr_5Si_3C_x/SiC$
Substrate

Figure 5A:
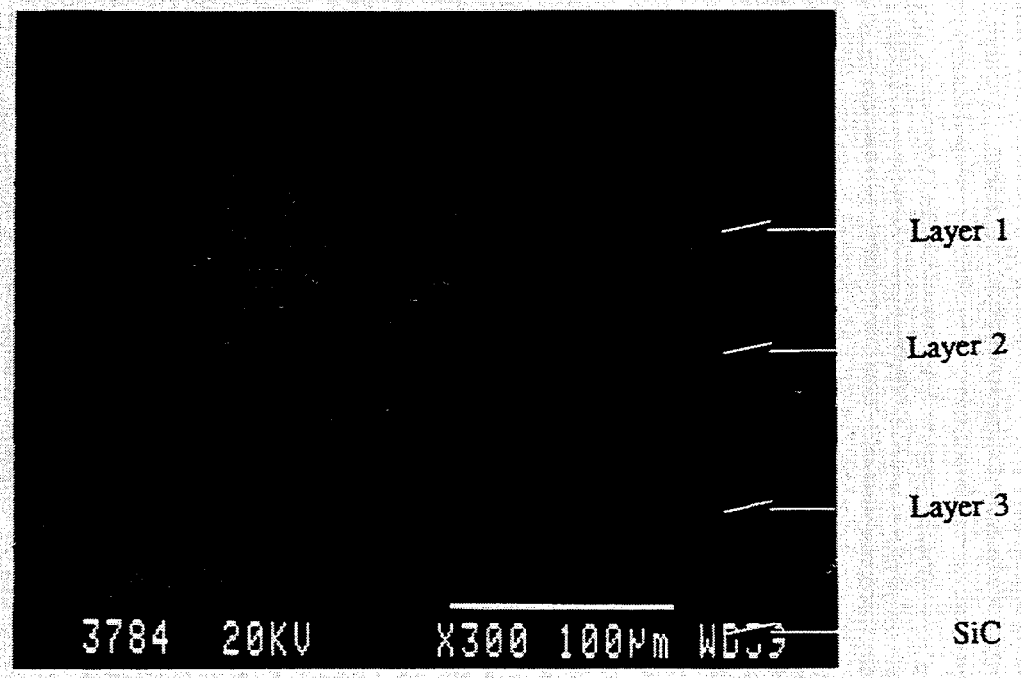
FIG. 5(a) is a cross sectional SEM micrograph of a coated SiC sample under the BSE mode.
Figure 5B:
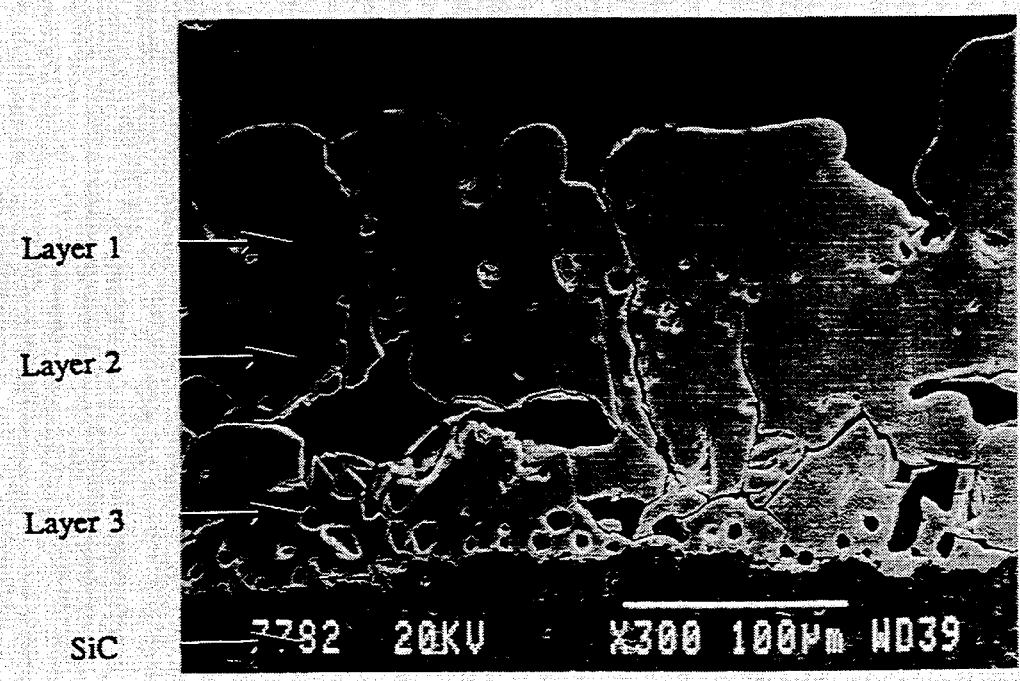
FIG. 5(b) is a cross sectional SEM micrograph of a coated SiC sample under the SEl mode.

FIGS. 5(a) and (b) show two cross-sectional SEM micrographs of the SiC sample coated with System #2. Again, both micrographs were taken at the same location but one under SEl mode (FIG. 5[b]) and the other BSE mode (FIG. 5[a]). The SEl micrograph reveals that a total coating thickness of 160–185 μm was achieved. Similar to the samples coated in System #3, voids are found in the coating as a result of the pre-existing substrate porosity. Most of the voids are also distributed near the coating/substrate interface, and the outer surface of the coating is relatively dense and essentially pore-free. However, compared to the coating from System #3, this coating appears to contain relatively more voids and the outer coating surface is not as uniform.

The BSE micrograph (FIG. 5a) shows that, like the coating from System #3, this coating also exhibits a multi-layered structure consisting of three layers.

Figure 6:
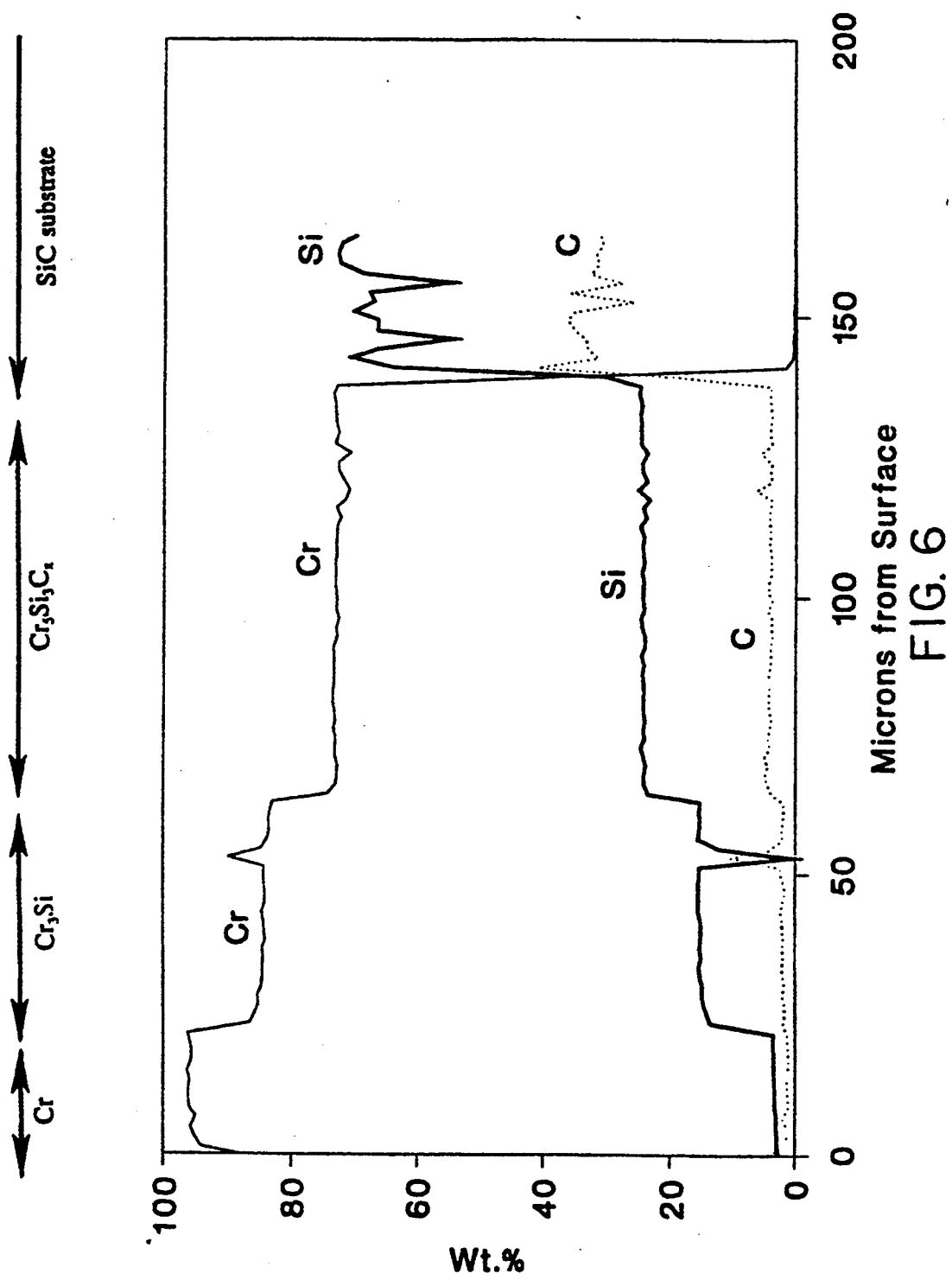
FIG. 6 plots the concentration profiles of Cr, Si, and C generated by electron microprobe analysis (EMPA) from the coating surface into the substrate.

FIG. 6 summarizes the concentration profiles of Cr, Si, and C generated by EMPA from the coating surface into the substrate. The outer layer, with a thickness of ~20 μm, contains 90–96 wt. % Cr, 2.5–3.6 wt. % Si, and ~1 wt. % C. Such a high Cr concentration suggests that the outermost layer is the Cr metal phase containing small amounts of dissolved Si and C. The middle layer is composed of ~85 wt. % Cr, 15.5% Si, and 2 wt. % C. According to the ternary phase diagram in FIG. 1, the middle layer would be the $Cr_3Si$ intermetallic compound containing some dissolved C. FIG. 1 shows that an equilibrium between $Cr_3Si$ and the Cr metal phase is possible.

The composition of the innermost layer is comprised of ~73 wt. % Cr, 24wt. % Si, and 4–6 wt. % C. Again, using the phase diagram in FIG. 1, the layer containing an appreciable amount of C in equilibrium with $Cr_3Si$ should be the T phase, i.e., the $Cr_5Si_3C_x$ compound.

Overall, the multi-layered coating morphology achieved by System #2 can be expressed as:

$Cr/Cr_3Si/Cr_5Si_3C_x/SiC$ substrate

All of the Cr, $Cr_3Si$, and $Cr_5Si_3C_x$ sub-layers converted on SiC contain high concentrations of Cr. Thus, similar to the chromium-carbide coating achieved by System #3, they all possess the ability to form a protective $Cr_2O_3$ scale on SiC upon exposure to corrosive environments.

Two multi-layered conversion coating systems, with total coating thicknesses of 160 and 160–185 μm, respectively, were produced on Hexoloy SA SiC. The resulting coating morphologies are expressed as follows:

$Cr_{23}C_6/Cr_7C_3/Cr_7C_3+Cr_3Si/Cr_5Si_3C_x/$ SiC
Substrate $Cr/Cr_3Si/Cr_5Si_3C_x/SiC$ substrate Both coating systems exhibit excellent coating adherence. In addition, the outer surfaces of the coatings are relatively dense and pore-free. Such a morphological feature allows the surface coatings to effectively protect the porous substrate materials from the corrodants. The inclusion of Al to the source metal (masteralloy) in the pack mix appears to improve the coating quality, as demonstrated by System #6. Such findings suggest that co-deposition of other elements with Cr may further enhance the characteristics of the conversion coatings.

It is possible that co-diffusion of multiple elements may be engineered to improve the coating toughness and eliminate surface cracks. It is possible to co-diffuse other elements, such as Al, with Cr in conversion coatings processes to further improve the coating adherence, morphology, and other mechanical properties. For example, the addition of Al to the masteralloy of System #6 may have increased the coating toughness slightly.

It is believed that the voids formed in the coating layers are primarily caused by the large number of pre-existing pores in the SiC substrates. Therefore, to minimize the void formation, it is necessary to select a SiC material with a higher bulk density.

Another aspect of the present invention is directed towards producing a high temperature coating converted directly on the continuous fiber ceramic composites (CFCC) fibers and within their surface pores to improve the corrosion resistance of the SiC-based CFCCs.

The present invention produces conversion coatings on the fibers and pore surfaces of CFCCs. These coatings improve the corrosion resistance and gas tightness of the CFCCs. The chromium-carbide and chromium coatings are directly converted on the fibers and the pore surfaces of the CFCC like silicon carbide CFCC via the previously described diffusion process. Because surface reactions and diffusion are involved, the resulting conversion coatings exhibits excellent adhesion to the SiC substrate surfaces. The existence of a chromium carbide or chromium outer layer enables the formation of a protective $Cr_2O_3$ scale on the surfaces of carbide-based CFCCs upon exposure to high temperature corrosive environments. Thus, the corrosion resistance improves carbide-based CFCCs to molten ash deposit and sulfidation. In addition, the resulting volume expansion of the fibers from the coating formation narrows or closes the gaps of the porosity making them suitable for applications where gas tightness is required.

The pack cementation technique utilized in conversion coatings processes of the present invention is quite cost effective compared to other types of commercial coating techniques. All of the coating chemicals required are readily available commercially. The coating processes are also relatively simple and not labor intensive.

In large-scale production of the conversion coating on SiC and its derivatives, the commercial chromizing facility existing for coating metallic substrates may be used, and only minimum efforts are required for equipment modification.

The conversion coating systems invented here contain a multi-layered structure, with the innermost layer being more ceramic like and the outermost layer more metal like. Such coating morphologies offer a gradual transition in the coefficients of thermal expansion (CTE). Therefore, the CTE mismatch between the coating layers and the SiC substrate would be minimized. A low CTE mismatch should result in a better coating adherence under thermal cyclic conditions. The addition of Al to the pack mix (or coating systems) may increase the coating adherence.

While specific embodiments of the present invention have been shown and described in detail to illustrate the application and principles of the invention, it will be understood that it is not intended that the present invention be limited thereto and that the invention may be embodied otherwise departing from such principles.

Although the process parameters for conversion coatings of silicon carbide are specified, their ranges can be expanded or the chemicals be varied to achieve similar successes. For example, based on simple diffusion analysis, similar coating results may be achieved in the coating temperature range of 1000°–1400° C. with proper variation in the coating times. The cover gas may be either industrial argon, nitrogen, or other inert and reducing gases, with or without a prior de-oxidation treatment. The source metal/master alloy may be powder of pure Cr or Cr-Al alloy containing up to 20 wt. % Al. The activator may be the claimed $AlCl_3$ and $NH_4Cl$, or other inorganic salts, such as $AlBr_3$ and $NH_4Br$. The $Al_2O_3$ inert filler used here may be easily replaced by other stable oxides, such as $ZrO_2$ CaO, MgO and $SiO_2$ (Note: $SiO_2$ may be used at lower coating temperatures so that it will not sinter). In addition, the same coating concept and process can be used to produce chromium-rich coating phases on many other types of ceramic materials/compounds, such as boron carbide ($B_4C$), silicon nitride ($Si_3N_4$), and titanium carbide (TIC).

I claim:

1. A method for making a chromium carbide conversion coating on a ceramic carbide, comprising the steps of:
   placing the ceramic carbide and a pack mix in a retort;
   providing an inert cover gas in the retort;
   heating the retort to a temperature in the range of 1000°–1400° C. to diffuse chromium into a surface of the ceramic carbide; and
   maintaining this temperature for a period of time to convert the surface of the ceramic carbide to a multi-layer coating which includes chromium carbide.

2. A method as recited in claim 1, wherein the pack mix comprises at least one metal source, at least one activator, and an inert filler.

3. A method as recited in claim 2, wherein the at least one metal source is a member selected from the group consisting of a pure metal powder, and an alloy powder.

4. A method as recited in claim 3, wherein the at one least metal source is a member selected from the group consisting of chromium and chromium-aluminum.

5. A method as recited in claim 4, wherein the pack mix includes a composition comprising on a weight percent basis of about 20 percent metal source, about 3 percent activator, and about 77 percent inert filler.

6. A method as recited in claim 5, wherein the heating step includes the step of heating to about 1250° C. and holding at that temperature.

7. A method as recited in claim 6, wherein the holding step includes the step of holding at about 1250° C. for about 30 hours.

8. A method as recited in claim 2, wherein the at least one activator is a member selected from the group consisting of $AlCl_3$, $NH_4Cl$, $AlBr_3$, and $NH_4Br$.

9. A method as recited in claim 2, wherein the inert filler is a member selected from the group consisting of $Al_2O_3$, $ZrO_2$, CaO, MgO, and $SiO_2$.

10. A method as recited in claim 1, wherein the ceramic carbide is a member selected from the group consisting of silicon carbide, boron carbide, and titanium carbide.

11. A method for forming a chromium carbide conversion coating on silicon carbide, comprising the steps of:

placing at least one surface of a silicon carbide workpiece in a pack mix in a retort;
providing an inert cover gas in the retort;
sealing the retort;
heating the retort to a temperature in the range of 1000°–1400° C. to diffuse chromium into the at least one surface of the silicon carbide workpiece; and
maintaining this temperature for a period of time to convert the at least one surface of the silicon carbide workpiece to a coating which includes chromium carbide.

12. A method for forming a chromium conversion coating on silicon carbide, comprising the steps of:
preparing a pack mix comprising a chromium-containing source metal, at least one activator, and a filler;
placing at least one surface of a silicon carbide workpiece in the pack mix in a retort;
providing an inert cover gas in the retort;
sealing the retort; and
heating the retort to a temperature of about 1250° C. and holding at that temperature to diffuse chromium into the at least one surface of the silicon carbide workpiece to convert the at least one surface of the silicon carbide workpiece to a coating which includes chromium carbide.

13. A method as recited in claim 12, wherein the heating step includes the steps of holding at a temperature of about 1250° C. for about 30 hours.

14. A method as recited in claim 12, wherein the at least one activator is a member selected from the group consisting of $AlCl_3$, $NH_4Cl$, $AlBr_3$ and $NH_4Br$.

15. A method as recited in claim 12, wherein the pack mix includes a composition on a weight percent basis of about 20 percent chromium source metal, about 3% activator, and about 77% inert filler.

16. A method as recited in claim 15, wherein the inert filler is a member selected from the group consisting of $Al_2O_3$, $ZrO_2$, $CaO$, $MgO$, and $SiO_2$.

17. A method as recited in claim 12, wherein the chromium-containing source metal is a member selected from the group consisting of a pure chromium metal powder and a binary chromium-aluminum powder.

* * * * *